Feb. 5, 1963 R. M. STEBBINS 3,076,259
PULLER FOR UNIVERSAL JOINTS
Filed May 18, 1959 2 Sheets-Sheet 1

INVENTOR.
RAY M. STEBBINS
BY
Owen & Owen
ATTORNEYS

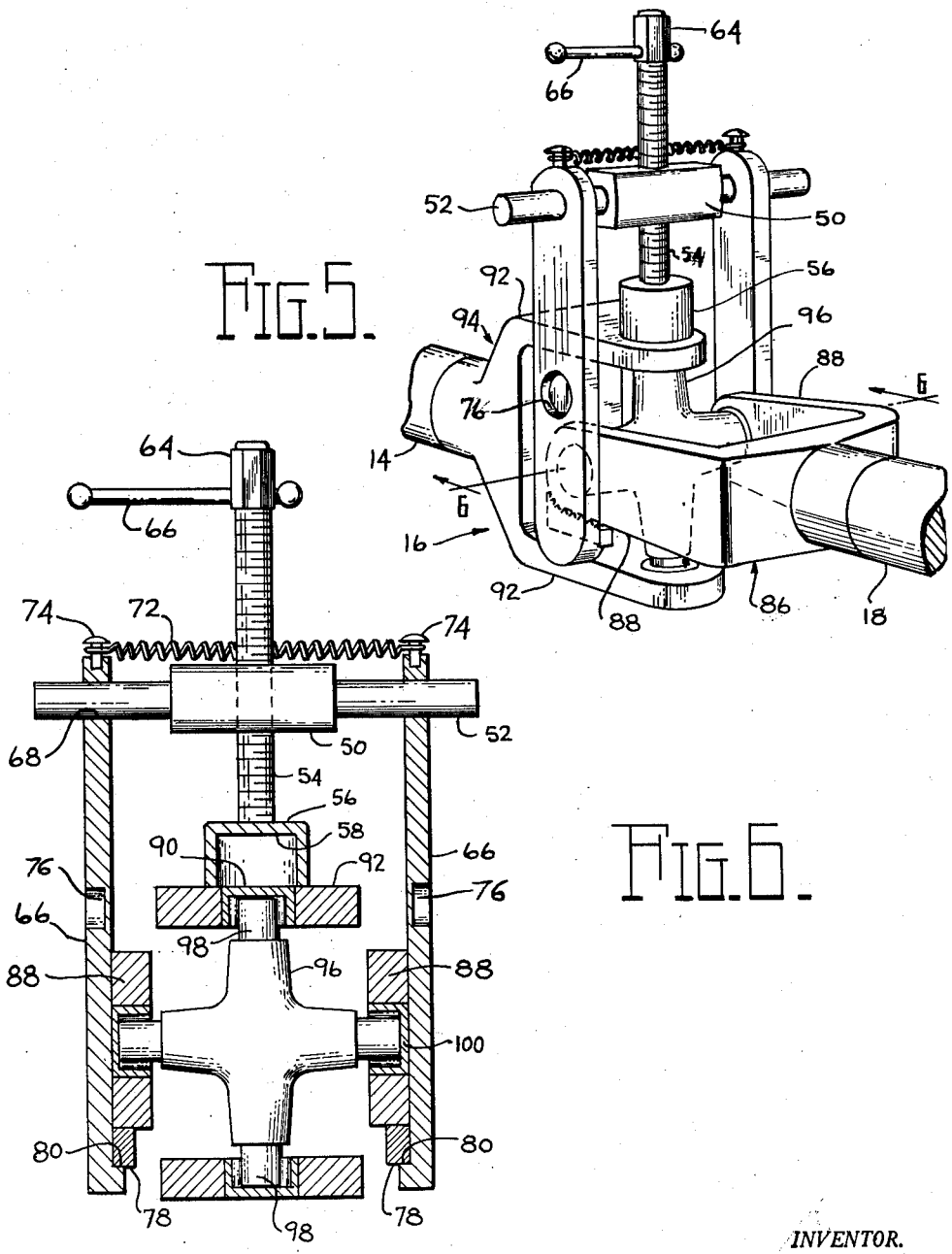

United States Patent Office 3,076,259
Patented Feb. 5, 1963

3,076,259
PULLER FOR UNIVERSAL JOINTS
Ray M. Stebbins, 3847 Eggeman Ave., Toledo, Ohio
Filed May 18, 1959, Ser. No. 813,954
1 Claim. (Cl. 29—259)

This invention relates to an improved puller designed especially for disassembling universal joints and parts of a similar nature.

In passenger vehicles, the trunnions of universal joints are usually packed permanently with grease, without grease fittings for subsequent lubrication. Occasionally, dirt, water, or other impurities, get into the trunnion cups and eventually causes the trunnions to freeze, which may also happen if the trunnion seals break and the lubricant is lost. When the trunnions freeze, extensive damage usually results to the universal joint components, the drive shaft, the connecting shaft, or the transmission seals, for example. Although such mishaps can be decreased greatly by more frequent lubrication of the trunnions, this is difficult to do and time consuming, because the universal joints must be disassembled. This job is distasteful to most mechanics and expensive for the customer; therefore, the universal joints in many cars do not get greased during the lives of the cars or until the trunnions freeze.

The present invention provides a new puller designed especially for universal joints which greatly facilitates disassembly and, hence, the lubrication thereof. This job is made easier and faster for the mechanic and less costly to the car owner.

The new puller includes a main body to which a pair of legs are connected. The legs have means to engage separately the cross member of the universal joint and arms of a first yoke thereof, in a manner to urge it or them toward an arm of a second yoke of the universal joint. The main body has a threaded shank with a member at an end thereof which engages the arm of the second yoke around a trunnion cup located in a hole of the arm with a force fit. As the threaded shank is screwed toward the parts, the cross member is urged toward the arm of the second yoke and the trunnion cup is pushed therethrough. The legs of the puller are mounted for longitudinal movement on pins on the main body so that the legs can be spaced apart at varying distances to accommodate universal joints of many sizes. Also, the first yoke engaging means of the legs are designed to accommodate yokes of various shapes.

It is, therefore, a principal object of the invention to provide an improved puller designed especially for disassembling universal joints and which will accommodate universal joints of a wide variety of sizes and shapes.

Another object of the invention is to provide a puller which enables universal joints to be more easily disassembled and renders lubrication thereof faster and less expensive.

Other objects and advantages of the invention will be suggested from the following detailed description of a preferred embodiment thereof, reference being made to the accompanying drawing, in which:

FIG. 5 is a view in perspective similar to FIG. 3 but with legs of the puller reversed and with the puller in an operative position with respect to the front universal joint shown in FIG. 1; and FIG. 6 is a view in vertical cross section taken along the line 6—6 of FIG. 5.

Figure 1:
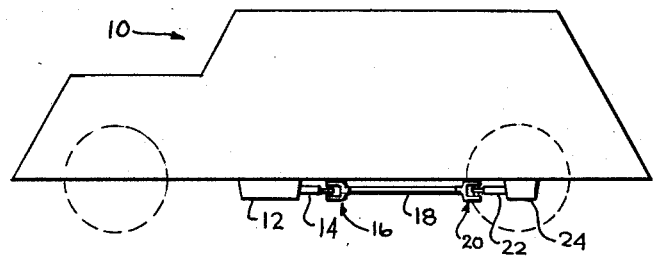
FIG. 1 is a schematic view of a car showing a front and a rear universal joint in locations as commonly found on many cars.

Referring to FIG. 1, a car 10, represented schematically, has a transmission 12, a first drive shaft section 14, which has a spline connection with the transmission 12, a front universal joint 16, a connecting shaft 18, a rear universal joint 20, a second drive shaft 22, and a differential 24. Each of the universal joints 16 and 20, of any conventional design, includes two yokes which are mutually perpendicular with a cross member mounted for pivotal movement in arms of both yokes.

Figure 2:
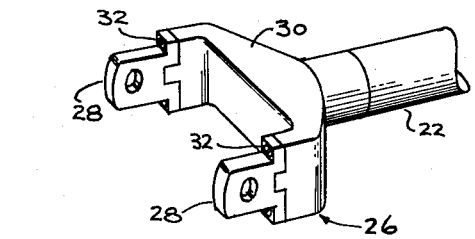
FIG. 2 is a greatly enlarged, detailed view in perspective of one yoke of the rear universal joint shown in FIG. 1.

Referring more particularly to FIG. 2, a first rear yoke 26 of the rear universal joint 20, which yoke is affixed to the second drive shaft 22, has a pair of removable arms 28 attached to a main body 30 of the yoke 26 by bolts 32, or similar fasteners. This arrangement enables the rear universal joint 20 to be partially disassembled by removing the bolts 32 and slipping the removable arms 28 off trunnion pins 34 (FIGS. 3 and 4) of a cross member 36. The rear end of the connecting shaft 18 can then be dropped below the second drive shaft 22 and the first drive shaft 14 can be slid out of the transmission 12 which is made possible by the splined connection of the shaft 14 in the transmission 12. This frees the combination of the first drive shaft 14, the front universal joint 16, the connecting shaft 18, and a portion of the rear universal joint 20 from the car 10.

Figure 3:
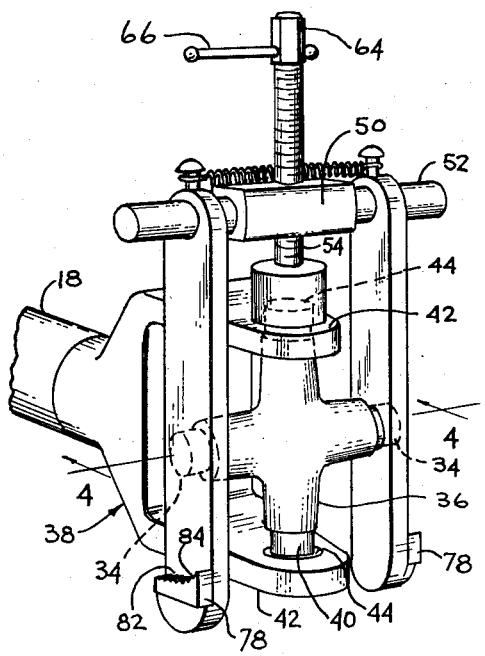
FIG. 3 is a view in perspective of a puller according to the invention in an operative position with respect to the rear universal joint shown in FIG. 1, with the yoke thereof shown in FIG. 2 removed and with the remaining yoke and a cross member partially disassembled.
Figure 4:
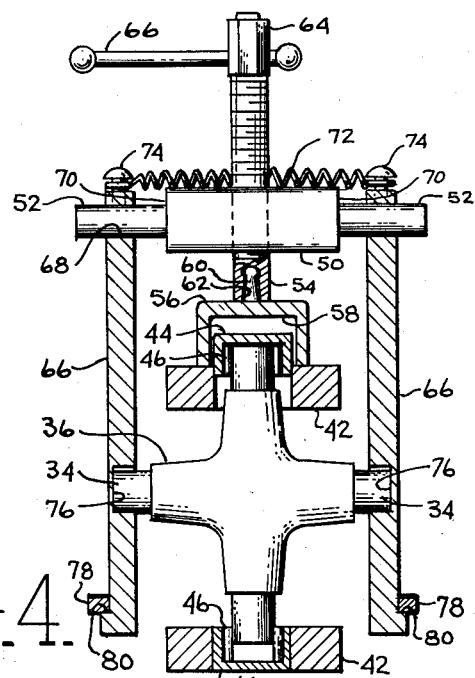
FIG. 4 is a view in vertical cross section taken along the line 4—4 of FIG. 3.

The part of the rear universal joint 20 which remains with the connecting shaft 18 includes the cross member 36 and a second rear yoke 38, shown in FIGS. 3 and 4. The trunnions of the cross member 36 can be easily lubricated because the removable arms 28 have been separated. However, two trunnion pins 40 of the cross member 36, which pins are rotatably mounted in arms 42 of the yoke 38 by trunnion cups 44 and needle bearings 46, must be at least partially separated therefrom to enable a lubricant to be applied. Seals (not shown) are employed around the trunnion pins 40 at the openings of the cups 44 to maintain lubricant therein. The trunnion pins 34 are held in similar trunnion cups in the removable arms 28. The cups 44 are received in holes in the arms 28 and 42.

A puller according to the invention is used to separate the trunnion cups 44 from the arms 42. This part of the lubricating job previously was the most difficult and the most time consuming; however, the new puller accomplishes this both easily and rapidly. The puller includes a main body 50 having a pair of pins 52 aligned and extending outwardly from each end of the body 50 and having a tapped hole in the center thereof through which a threaded shank 54 extends. A part engaging member 56 with a part receiving recess 58 is rotatably attached to the bottom end of the threaded shank 54 by means of a projection 60 thereon fitting into a recess 62 (FIG. 4) in the shank 54. The upper end of the shank 54 has a hexagonal head 64 adapted to receive a wrench and also a handle 66 for turning the shank.

A pair of legs 66 have holes 68 at their upper ends into which the pins 52 are inserted with a loose fit so that the legs can pivot thereon and also slide back and forth longitudinally of the pins. The legs 66 are urged toward one another and toward shoulders 70 formed between the body 50 and the pins 52 by spring or other resilient means 72 connected between studs or hooks 74 on each leg. The legs 66 have part engaging means or recesses 76 near the lower ends to receive the trunnion pins 34 of the cross member 36.

The upper trunnion pin 40 and the upper trunnion cup 44 of the cross member 36, which constitute a first part, are separated from the upper arm 42, which constitutes a second part, by first inserting the trunnion pins 34 of the cross member or first part 36 into the recesses 76 of the legs 66 so that the legs will engage a side of each trunnion pin 40 opposite a side nearer the main body 50. The part engaging member 56 is then aligned so that it will engage the upper arm or second part 42 around the upper cup 44, which constitutes a portion of the first part or cross member 36. The shank 54 is then screwed downwardly toward the parts which tends to push the upper arm 42 downwardly or the cross member 36 upwardly so that the upper cup 44 is forced through the upper arm 42. The upper cup 44 need not necessarily be forced completely through the arm 42 but only far enough that the lower trunnion pin 40 clears the lower cup 44 so that a lubricant can be inserted thereinto. The cross member 36 is then pushed downwardly and lubricant is similarly inserted into the upper cup 44 which is pounded back into place after lubrication is completed. The cups in the removable arms 28 are easily lubricated, of course, when they are separate from the trunnion pins 34.

After the rear universal joint 20 is lubricated, the front universal joint is lubricated next by first separating a front cross member from the upper arm of each front yoke. To accomplish this, the puller is first modified by reversing the legs 66 by sliding them off the pins 52, rotating them 180° about their longitudinal axes, and then inserting the pins 52 through the holes 68 in the opposite direction. The spring 70 is sufficiently resilient to enable the legs 66 to be slid off the pins 52 in this manner.

Reversal of the legs 66 places a pair of part receiving means or flanges 78 on the inner sides of the legs. The flanges 78 are located against shoulders 80 at the lower ends of the legs 66 and are suitably affixed to the legs by screws or the like. The upper, cleated edge of each of the flanges 78 can be extended horizontally straight across the flange or can include a straight portion 82 which is preferably at an angle of about 7° to the horizontal and a curved portion 84 which fits around the ends of the arms of the yokes. This particular shape enables the flanges 78 to bear adequately against yokes of a wide variety of shapes. Although the flanges 78 can be placed on the same sides of the legs 66 as the recesses 76 for some universal joints, for others the flanges would interfere with the lower arm 42 of the yoke 38 when the trunnion pins 34 are engaged in the recesses 76. Hence, the recesses 76 and the flanges 78 are placed on opposite sides of the legs 66.

The puller with the legs reversed is then used to disassemble the front universal joint 16. A first front yoke 86 is placed in a horizontal position as shown in FIG. 5 and the legs 66 are spread and placed over arms 88 of the yoke 86 with the flanges 78 contacting each of the outer ends thereof on a side opposite a side near the main body 50. The shank 54 is then screwed downwardly to place the part engaging member 56 around a trunnion cup 90 in contact with an arm 92, which constitutes a second part, of a second front yoke 94. The arms 88 and the trunnion cups 90 connected to a cross member 96 constitute a first part in combination with the cross member. The threaded shank 54 is then screwed downwardly further to force the upper arm 92 downwardly or the cross member 96 upwardly thereby to force the trunnion cup 90 through the upper arm 92. In this case, the trunnion cup 90 is preferably forced completely through the upper arm 92 so that the cross member 96 can be completely separated from the arms 92 of the yoke 94. The legs 66 are then reversed and the part receiving means or recesses 76 are inserted over trunnion pins 98 of the cross member 96 and a trunnion cup 100 in the arm 88 is removed in the same manner as the cup 44 in FIGS. 3 and 4 is removed. Alternately, lubricant can be placed in the cups 90 and the upper cup then pounded back into place. The front universal joint 16 then can be rotated 90° and the grippers 78 placed in contact with the ends of the arms 92; one of the cups 100 is then removed in the same manner as the cup 90 is removed. After the cups 100 are lubricated, they are replaced in their original positions in the arms 88. The first drive shaft 14 is then inserted in the transmission 12 and the rear universal joint 20 is reassembled to complete the job.

The puller can be employed with universal joints of almost any size because the legs 66 can be spaced apart any distance up to the distance between the outer ends of the pins 52. Further, the shape of the flanges 78 enable the puller to adequately contact yoke arms of almost any shape. For this purpose, the legs 66 can be moved back and forth on the arms of a yoke to enable the fullest contact of the flanges 78 therewith. It is not necessary that the legs 66 be parallel with the threaded shank 54. These elements can be at an angle to the shank 54 as the flanges are moved back and forth on the arms, which is made possible by the pivotal connection of the legs 66 with the pins 52.

Numerous modifications of the puller will be apparent to those skilled in the art, and it should be understood that such modifications can be made without departing from the invention as defined by the appended claim.

I claim:

A puller for disassembling a universal joint for lubrication of same, which joint includes a pair of mutually perpendicular yokes, each with a pair of arms extending therefrom and a cross member having mutually perpendicular trunnion pins rotatably mounted in bearing cups in said arms, said puller comprising a main body, a pair of axially aligned pins extending outwardly from ends of said main body, a pair of legs, one end of each of which is slidably held on each of said pins for longitudinal movement with respect thereto, resilient means connected to said legs near said aligned pins and urging said legs toward one another, a flange on each of said legs toward the other end thereof, each of which is adapted to contact an arm of a universal joint yoke, a threaded shank extending through said body perpendicularly to said aligned pins, an opening in each of said legs intermediate said flanges and said pins, said openings being adapted to receive said trunnion pins after they are separated from their associated bearing cups, and an arm-engaging cup rotatably mounted on an end of said threaded shank, said arm-engaging cup having an inner diameter greater than outer diameters of the bearing cups of said universal joint yoke arms so as to be adapted to engage an arm of the other yoke not engaged by said flanges, around a bearing cup held therein.

References Cited in the file of this patent

UNITED STATES PATENTS

| | | |
|---|---|---|
| 1,361,316 | Dotzer et al. | Dec. 7, 1920 |
| 1,440,992 | Harzke | Jan. 2, 1923 |
| 1,494,832 | Grant | May 20, 1924 |
| 1,833,420 | Haman | Nov. 24, 1931 |
| 2,077,254 | Nestler | Apr. 13, 1937 |
| 2,188,074 | Condon | Jan. 23, 1940 |
| 2,551,900 | Pihl | May 8, 1951 |
| 2,684,527 | Hedlund | July 27, 1954 |
| 2,821,776 | Keister | Feb. 4, 1958 |
| 2,821,777 | Keister | Feb. 4, 1958 |
| 2,853,774 | Peterson | Sept. 30, 1958 |